May 27, 1924.
J. E. REDFORD
SLACK ADJUSTER
Filed March 27, 1923
1,495,438
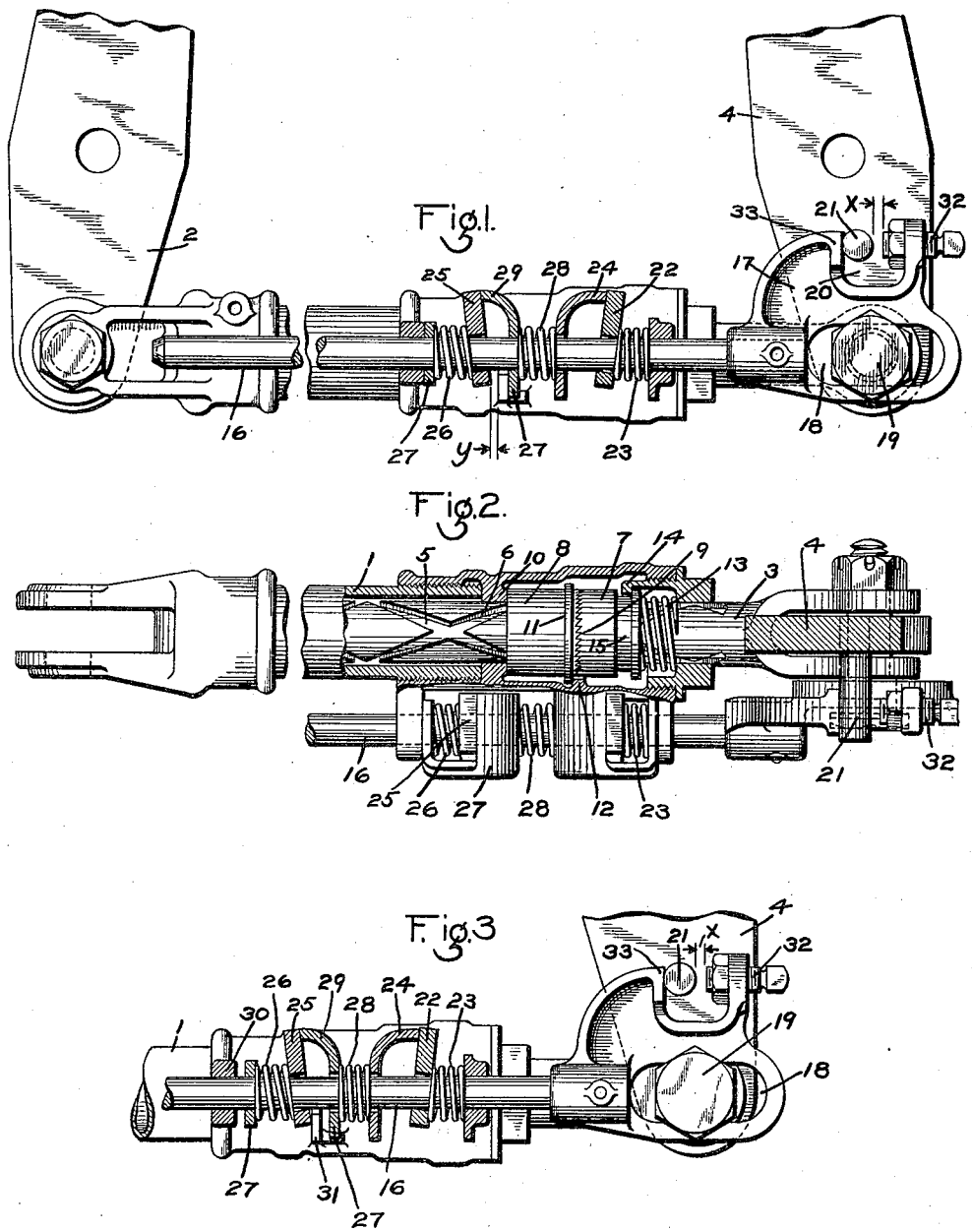
INVENTOR
JOHN E. REDFORD
BY *Wm. M. Cady*
ATTORNEY Patented May 27, 1924.

1,495,438

UNITED STATES PATENT OFFICE.

JOHN E. REDFORD, OF KINLOCH PARK, MISSOURI, ASSIGNOR TO THE AMERICAN BRAKE COMPANY, OF ST. LOUIS, MISSOURI, A CORPORATION OF MISSOURI.

SLACK ADJUSTER.

Application filed March 27, 1923. Serial No. 627,999.

*To all whom it may concern:*

Be it known that I, JOHN E. REDFORD, a citizen of the United States, residing at Kinloch Park, in the county of St. Louis and State of Missouri, have invented new and useful Improvements in Slack Adjusters, of which the following is a specification.

This invention relates to slack adjusters for automatically taking up slack due to the wear of the brake shoes on the car wheels.

With certain types of mechanically operated automatic slack adjusters, an operating rod is employed and a dog is provided for holding the operating rod in its adjusted position after the slack adjuster has operated to take up slack.

In some instances, it has been found that due to excessive vibrations of the parts, the operating rod tends to gradually slip forward through the dog, so that what might be called false slack is registered.

The principal object of my invention is to provide means in a slack adjuster of the above type for preventing false forward movement of the operating rod.

In the accompanying drawing; Fig. 1 is an elevational view, partly in section, of a slack adjuster embodying my invention; Fig. 2 a plan view thereof, partly in section; and Fig. 3 an elevational view of a portion of the construction shown in Fig. 1, showing the parts in normal operating position.

In order to illustrate one application of my invention, I have shown my invention applied in connection with a mechanically operated slack adjuster of the type shown in my prior Patent No. 1,381,932, dated June 21, 1921.

In this type of slack adjuster, the slack adjuster is associated with the bottom rod member of the brake rigging and comprises a sleeve member 1, pivotally connected to the end of one brake lever 2, and a rod member 3, pivotally connected to the end of the other brake lever 4, and extending into the sleeve member 1.

The rod member 3 is provided with right and left hand spiral grooves 5 and 6. A nut 7 is mounted on the rod member 3 and is provided with a thread section for engaging the right hand groove 5 and a nut 8 is similarly provided with a thread section for engaging the left hand groove 6. The pitch of the spiral grooves is such that when either nut is free to rotate, the rod member 3 may be moved longitudinally with respect to the nut.

The adjacent meeting faces of the nuts 7 and 8 are provided with cooperating teeth 9 which when engaged are adapted to prevent relative rotative movement of the nuts 7 and 8 in one direction but which permit relative rotative movement in the opposite direction. The nut 8 is prevented from moving longitudinally toward the left by engagement with a shoulder 10 of the sleeve member 1 and is prevented from moving longitudinally toward the right by the engagement of a collar 11 with a flange 12 carried by the sleeve member 1.

The right hand nut 7 may move longitudinally toward the right against the resistance of a coil spring 13 but is prevented from moving longitudinally toward the left by engagement of a flange 14 in a groove 15 of the nut.

Positioned in parallel alinement with the members 1 and 3 is an operating rod 16 having a crosshead 17 secured at the right hand end. Said crosshead is provided with an elongated slot 18 for receiving the extended end of the pin 19 which pivotally connects the brake lever 4 with the rod member 3. The crosshead 17 is also provided with a slot 20 for receiving a pin 21 carried by the brake lever 4.

The operating rod 16 extends through openings in an extended portion of the sleeve member 1 and mounted on said rod is a tiltable dog 22 subject to the pressure of a coil spring 23 and having the outer edge in engagement with a flange 24 carried by the sleeve member 1, so that the flange 24 acts as a fulcrum for the dog 22 and thereby causes a gripping action of the dog on the rod 16, so that longitudinal movement of the rod 16 toward the left is prevented.

In addition to the above described parts and in accordance with my present invention, a second tiltable dog 25 is mounted on the rod 16 and is subject to the pressure of a coil spring 26. Mounted on the rod 16 is a housing 27, subject to the pressure of a coil spring 28 and having a flange 29 adapted to engage the outer edge of the dog 25, so that the flange 29 acts as a fulcrum for the dog 25 and thereby causes a gripping action of the dog 25 on the rod 16, so that forward longitudinal movement of the rod 16 relative to the dog 25 is prevented. The longitudinal movement of the housing 27 is limited in one direction by engagement with a lug 30 carried by the sleeve member 1 and by engagement with a lug 31.

In operation, when the brakes are applied, the brake levers 2 and 4 move so that the pin 21 travels toward the adjusting screw 32 and if the slack does not exceed a predetermined amount, as measured by the gap X between the pin 21 and the end of the screw 32, then no slack adjusting action will take place, but if the movement of the brake levers to bring the brake shoes against the car wheels exceeds a predetermined amount, due to wear of the brake shoes, then the pin 21 will act on the screw 32 so as to move the crosshead 17 to the right and thus pull the operating rod 16 forward and through the dog 22 against the frictional resistance of the dog 22 as caused by spring 23.

As the operating rod 16 moves toward the right, the housing 27 is carried forward, compressing the spring 28, by reason of the engagement of the dog 25 with the rod 16. When the housing 27 has moved forward a distance Y, as shown in Fig. 1, the dog 25 will engage the lug 31 and thus trip the dog 25, so that further longitudinal movement of the rod 16 toward the right is permitted by the slipping of the rod 16 through the dog 25.

The parts will now be in the normal operating condition, with the dog 25 engaging the lug 31, as shown in Fig. 3.

Upon releasing the brakes, the dog 22 grips the rod 16 and prevents movement of the rod toward the left and as the brake lever 4 moves inwardly in its release movement, the pin 21 engages the wall 33 of crosshead 17 which acts as a fulcrum for the pin 21, so that further movement of the brake lever 4 causes a forward movement to the right of the rod member 3. This movement is permitted due to the fact that when force is applied to the rod member 3 in a direction tending to shift the rod toward the right, the teeth 9 will disengage to permit a relative rotative movement of the nuts 7 and 8 in opposite directions, so that longitudinal forward movement of the member 3 is permitted and the bottom rod connection is thus lengthened to compensate for slack.

With the parts positioned as shown in Fig. 3, the spring 28 is under compression and exerts its force through the dog 25 on the rod 16 in a direction tending to hold the rod 16 against forward movement to the right, so that when the parts are subjected to vibration in the running of the car, the device will tend to prevent accidental forward movement of the rod 16 when not intended. The construction will not prevent forward movement of the rod 16, however, when such movement is positively effected by the action of the slack adjuster parts, since in such case, the forward pull on the operating rod 16, when the pin 21 acts on the screw 32, operates to release the dog 25, by the engagement of the dog with the lug 31. At the same time, it will be noted that the tension of the spring 28 is constantly maintained at a fixed point.

Having now described my invention, what I claim as new and desire to secure by Letters Patent, is:—

1. The combination with a slack adjuster including an operating rod longitudinally movable in one direction in the operation of taking up slack and a clutch device for preventing longitudinal movement of the rod in the opposite direction, of a spring mounted on said rod and adapted to yieldingly oppose longitudinal movement of the rod in the first mentioned direction.

2. The combination with a slack adjuster mechanism including an operating rod having a forward longitudinal movement in the operation of taking up slack and a dog for preventing rearward longitudinal movement of said rod, of a spring carried by said rod and operative to yieldingly oppose forward longitudinal movement of said rod.

3. The combination with a slack adjuster mechanism including an operating rod having a forward longitudinal movement in the operation of taking up slack and a dog for preventing rearward longitudinal movement of said rod, of a spring for resisting forward longitudinal movement of said rod, a dog engaging said rod for holding said spring under tension, and means for releasing said dog from said rod upon a forward longitudinal movement of said rod.

4. The combination with a slack adjuster mechanism including an operating rod having a forward longitudinal movement in the operation of taking up slack and a dog for preventing rearward longitudinal movement of said rod, of a spring for resisting forward longitudinal movement of said rod, and means for maintaining said spring under a substantially constant tension, regardless of the forward movement of said operating rod.

In testimony whereof I have hereunto set my hand.

JOHN E. REDFORD.